United States Patent [19]

Pastor et al.

[11] 4,170,612

[45] Oct. 9, 1979

[54] PRESSURE SENSITIVE ADHESIVE COMPOSITIONS

[75] Inventors: Stephen D. Pastor, Edison; Martin M. Grover, Upper Montclair, both of N.J.

[73] Assignee: National Starch and Chemical Corporation, Bridgewater, N.J.

[21] Appl. No.: 895,957

[22] Filed: Apr. 13, 1978

[51] Int. Cl.$^2$ .................. C08L 63/00; C08L 43/04; C08L 61/20; C08L 67/00
[52] U.S. Cl. .................................. 525/101; 156/329; 156/330; 156/331; 525/181; 525/185; 525/445; 525/259; 427/302 X
[58] Field of Search ............... 260/850, 826, 851, 836, 260/837 R, 859, 834

[56] References Cited

U.S. PATENT DOCUMENTS

| | | | |
|---|---|---|---|
| 2,599,576 | 6/1952 | Morris | 117/68.5 |
| 2,647,100 | 7/1953 | Salditt | 260/45.5 |
| 2,736,721 | 2/1956 | Dexter | 260/42 |
| 2,814,601 | 11/1957 | Currie | 260/29.1 |
| 2,982,759 | 5/1961 | Heuse | 260/79.3 |
| 3,277,208 | 10/1966 | Nersasian | 260/837 R |
| 3,528,940 | 9/1970 | Modic | 260/37 |
| 3,591,438 | 7/1971 | Toback | 156/310 |
| 3,629,363 | 12/1971 | Breda | 260/837 R |
| 3,890,407 | 6/1975 | Briggs | 260/878 R |
| 3,962,372 | 6/1976 | Arhart | 260/878 R |
| 3,975,323 | 8/1976 | Georgoudis | 260/22 D |
| 4,039,707 | 8/1977 | O'Malley | 428/40 |
| 4,113,792 | 9/1978 | Pastor | 260/834 |

FOREIGN PATENT DOCUMENTS 1954701 5/1971 Fed. Rep. of Germany ........... 260/836
176559 11/1965 U.S.S.R. .

*Primary Examiner*—Paul Lieberman
*Attorney, Agent, or Firm*—Edwin Szala; Ellen T. Dec

[57] ABSTRACT

Pressure sensitive adhesive compositions are prepared from a mixture of a specific pressure sensitive polymer, a chlorosulphonated polyethylene and a polymerizable vinyl compound. The compositions are cured to form a strong bond upon contact with a condensation reaction product of a primary or secondary amine and an aldehyde.

14 Claims, No Drawings

PRESSURE SENSITIVE ADHESIVE COMPOSITIONS

BACKGROUND OF THE INVENTION

I. Field of the Invention

The present invention relates to improved pressure sensitive adhesives characterized by superior cohesive strength, aggressive tack, load bearing ability, heat resistance and resistance to solvents. More particularly, the present invention is directed to pressure sensitive adhesive compositions comprising a mixture of a specific pressure sensitive polymer, a chlorosulfonated polyethylene and a polymerizable vinyl compound. The compositions are cured to form a strong bond upon contact with a condensation reaction product of a primary or secondary amine and an aldehyde.

II. Brief Description of the Prior Art

Pressure sensitive adhesives are used for a wide variety of sealing, holding, fastening, mending and masking purposes due to their ability to form a bond at room temperature immediately upon contact, merely by the application of light pressure.

The major disadvantage to the use of the pressure sensitive adhesives is that, by their chemical nature, they have inherently low cohesive strength. In addition, they are thermoplastic and soften rapidly at temperatures in excess of about 140° F.; hence they are limited to applications where the stress on the bond or assembled joint is low (i.e., generally less than 2 psi in shear) and where temperature exposure not much in excess of room temperature is expected under this stress. In addition, pressure sensitive adhesives generally soften and cannot be used where exposure to commonly encountered organic fluids, such as gasoline, lubricating oils, transformer oils and industrial cleaning compounds, is expected.

Various attempts have been undertaken to improve these inherent weaknesses of pressure sensitive adhesives, thus permitting expanded use thereof. As an example, the adhesive may be vulcanized or crosslinked during preparation of the pressure sensitive coated article; however, these treatments can offer only small improvement in strength if they are to avoid damaging the aggressive tack required of a pressure sensitive adhesive. Additionally, these treatments often require an extended drying cycle in terms of time and energy required as well as at temperatures which may distort or embrittle the articles being coated. In other instances, the inherent weaknesses of pressure sensitive adhesives have been overcome by crosslinking the adhesive once the pressure sensitive article has been bonded (i.e. the final assembly has been made). In all cases, such procedures generally involve cure temperatures in excess of 100° C. for periods of time varying from 30 minutes to several hours. Often such cures are not feasible due to the size of the assembled part or the elevated temperature sensitivity of various components of the assembly.

It is therefore an object of the present invention to provide a pressure sensitive adhesive composition which has aggressive tack for convenient application at room temperature.

It is a further object of the invention to provide an adhesive composition which cures or crosslinks subsequent to final assembly, the crosslinking being effected quickly and at room temperature in a manner such that the load bearing ability, heat resistance and resistance to various organic fluids are improved.

SUMMARY OF THE INVENTION

The novel improved pressure sensitive adhesives are particularly characterized by both aggressive tack and cohesive strength and comprise from 50-85% by weight of a polymer selected from the group consisting of polyvinylether, polyester and silicone pressure sensitive adhesive polymers, 4-24% of a chlorosulfonated polyethylene and 11-40% of a polymerizable vinyl monomer or unsaturated oligomer or mixtures thereof. These compositions are cured by contact with an initiator comprising the condensation reaction product of an aldehyde and a primary or secondary amine.

Thus, in accordance with the present invention, it has been found that the addition of a chlorosulfonated polyethylene and polymerizable vinyl monomer or unsaturated oligomer to specific conventional polymeric pressure sensitive adhesives will result, upon curing, in a dramatic improvement in cohesive strength as well as heat and solvent resistance without loss of aggressive tack prior to cure.

In addition to the required components, the adhesive composition of the invention may optionally include free radical generators, free radical stabilizers, etc., such components being useful in particular applications as will be described in detail hereinbelow Similar pressures sensitive adhesive compositions based on acrylic polymers are disclosed in U.S. Pat. No. 4,113,792.

DETAILED DESCRIPTION OF THE PREFERRED EMBODIMENTS

The pressure sensitive adhesive polymers used as the major component in the compositions of the present invention include all the conventionally employed polyvinylether, polyester and silicone based pressure sensitive adhesives. These adhesives are well known to those skilled in the art as any adhesives based on at least one of the above identified polymers which are tacky upon finger contact and which are generally characterized by a Williams plasticity number within the range of about 1.4 to 3 mm, preferably 2-2.8, and a Tg less than or equal to −20° C.

Specifically, such polyvinylether based pressure sensitive adhesives are comprised of polyvinyl alkyl ethers wherein the alkyl group contains 2 to 8 carbon atoms. The polymers may be homopolymers or copolymers formed from a mixture of polyvinyl alkyl ethers of varying numbers of carbon atoms and/or of varying degrees of polymerization. Typical adhesives are described in U.S. Pat. Nos. 2,599,576, and 2,647,100 among others.

The organopolysiloxane based pressure sensitive adhesives are also well known to those skilled in the art. These adhesives are generally formed from high molecular weight organopolysiloxanes often in combination with soluble silicone resins containing recurring SiO and/or $SiO_2$ units. Various modifications may be made to the components in order to improve the tack strength, or other commercially desirable properties. Typical polysiloxane adhesives are described in U.S. Pat. Nos. 2,814,601; 2,736,721; 4,039,707; 3,528,940, among others.

A third class of pressure sensitive polymers useful herein are the pressure sensitive polyesters. Such polyesters are well known to those skilled in the art and are generally prepared by the condensation reaction of diols with diacids to form pressure sensitive polyesters of the general structure:

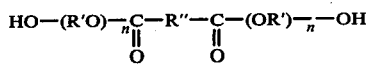

where R' is an alkylene group containing 2 to 10 carbon atoms and R" is an alkylene, cycloalkylene or aromatic group containing 2 to 20 carbon atoms and n is an integer from about 5 to 20. The polyester may be linear or branched as described in U.S. Pat. Nos. 3,383,342; 3,390,108; 3,329,740 and 3,300,543 and may be treated with various modifiers or chain extenders such as described in the above identified patents or in U.S. Pat. Nos. 3,300,543 and 3,975,323, among others.

As indicated above, the specific polymers herein are normally tacky and the composition of the polymer is chosen in accordance with known practice so as to provide a product of suitable tack. However, it is also within the scope of the present invention to include such polymers which do not initially exhibit commercially acceptable pressure sensitive properties but which, upon the inclusion of the polymerizable monomer or oligomer (to be discussed hereinbelow) and/or tackifier, will result in a system displaying sufficient tack to be considered pressure sensitive. Tack is normally inversely related to the plasticity of the polymer, which is a measure of the deformability of the polymer under an applied load. The polymers herein will generally have a Williams plasticity number below about 3 mm, although where the plasticity is above this level, some added tackifiers may be provided to produce the desired properties.

The chlorosulfonated polyethylene components employed herein contain from about 25 to 70 weight percent chlorine and about 3 to 160 millimoles sulfonyl chloride moiety per 100 grams of polymer, and the polyethylene from which the polymer is prepared should have a melt index of about 4–500. Suitable chlorosulfonated polyethylene polymers can be prepared in a manner well known to those skilled in the art by reaction of linear or branched polyethylene and sulfonyl chloride or sulfur dioxide and chlorine. Chlorosulfonated polyethylene is also available commercially, for example, from E. I. duPont de Nemours & Co. under the tradename "Hypalon." In practice the chlorosulfonated polyethylene may also be a chlorosulfonated copolymer of ethylene with small proportions of propylene or other olefins. Alternatively, sulfonyl chloride and chlorinated polyethylenes of suitable molecular weight can be used. The sulfonyl chlorides can be mono- or poly-functional and can be $C_1$–$C_{12}$ alkyl sulfonyl chlorides, $C_6$–$C_{24}$ aromatic sulfonyl chlorides such as benzene or toluene sulfonyl chloride. Some sulfonyl chlorides containing hetero atoms have also been found to work, such as diphenylether-4,4'-disulfonyl chloride. For convenience our use of the term "chlorosulfonated polyethylene" shall be understood to designate any of the above materials.

Various chlorosulfonated polyethylenes and methods of their preparation are discussed, as for example, in U.S. Pat. No. 2,982,759, the disclosure of which is incorporated herein by reference. The use of these polymers in conjunction with certain other polymers and curing agents therefor has also been described in the art. Thus, U.S. Pat. No. 2,968,677 teaches that chlorosulfonated polyethylene and specific elastomeric materials, e.g., natural rubber, copolymers of butadiene-styrene, isobutylene-isoprene, butadiene-acrylonitrile, or polychloroprene, could be combined in the presence of polyvalent metal oxide and cured using conventional rubber vulcanization technology.

As a third component of the pressure sensitive adhesives of the present invention there is required at least one low molecular weight vinyl monomer or unsaturated oligomer. Suitable low molecular weight vinyl monomers include (i) acrylic and methacrylic acids; (ii) the hydroxyalkyl esters of said acids, wherein the alkyl chains contain from 2 to 20 carbon atoms, e.g., 2-hydroxyethyl acrylate, hydroxypropyl acrylate, hydroxybutyl acrylate, hydroxyoctyl acrylate, etc., and the corresponding hydroxyalkyl methacrylates; (iii) the glycidyl esters of said acids; (iv) the ethylene glycol and polyethylene glycol diesters of said acids, e.g., ethylene glycol diacrylate, diethylene glycol diacrylate, triethylene glycol diacrylate, tetraethylene glycol diacrylate, etc., and the corresponding ethylene glycol dimethacrylate and polyethylene glycol methacrylates; (v) the polyhydric alcohol esters of said acids, e.g., the pentaerythritol tri- and tetraacrylates and the corresponding methacrylates; (vi) the non-gem alkanediol esters of said acids, e.g., 1,6-hexanediol diacrylate, 1,4-butane glycol diacrylate; (vii) the alkyl and alkyl substituted alkyl acrylates and methacrylates, wherein the alkyl groups contain from 2 to 20 carbon atoms, e.g., ethyl acrylate, ethyl methacrylate, propyl acrylate, propyl methacrylate, 2-ethylhexyl acrylate, etc., (viii) the cycloalkyl esters of said acids, wherein the cycloalkyl groups contain from 5 to 14 carbon atoms, e.g., cyclohexyl acrylate or cyclohexyl methacrylate; and (ix) trimethylolpropane triacrylate and corresponding methacrylate.

Polymerizable unsaturated oligomers include (1) unsaturated polyurethanes, (2) unsaturated epoxides, (3) unsaturated polyesters, and (4) vinyl terminated elastomers. The preparation of such unsaturated oligomers is familiar to those skilled in the art. An unsaturated polyurethane may be prepared, for example, by reacting a hydroxyl terminated polyester or polyether with toluene diisocyanate and hydroxyethyl acrylate in the presence of an organotin catalyst. Generally, the unsaturated epoxides employed will be a reaction product of acrylic or methacrylic acid with a polyfunctional epoxy compound containing at least two epoxy groups per molecule and having a molecular weight from about 200 to about 1,500. Commercially available epoxy compounds include Union Carbide's ERL-2795, Shell Chemical's Epon series of resins (e.g., Epon 812, 815, 820, 828 and 830) as well as the epoxy novalac resins sold by Dow Chemical under the DEN designation. Virtually any unsaturated polyester compositions can be employed, with the trifunctional hydroxyl terminated polyester supplied by Hooker Chemical as Rucoflex F-1017-18 esterified with acrylic acid and the bisphenol A - fumarate polyester supplied by ICI as the Atlac series being considered representative. Suitable vinyl terminated elastomers are represented by the vinyl terminated butadiene Hycar products supplied by B. F. Goodrich.

As an optional component there may also be present in the adhesive base composition a copolymerizable alpha, beta-unsaturated carboxylic acid, a half-ester of an unsaturated cyclic anhydride or a half-ester of a cyclic anhydride with hydroxyalkyl esters of alpha, beta-unsaturated carboxylic acids. Exemplary optional components include methacrylic acid, acrylic acid, crotonic acid, fumaric acid, itaconic acid, ethyl maleate monoester, n-butyl maleate mono-ester, i-propyl maleate mono-ester, 2-acryloxyethyl phthalate mono-ester, acryloxypropyl phthalate mono-ester, methacryloxyethyl phthalate mono-ester, 2-acryloxyethyl succinate mono-ester, 2-acryloxyethyl methylsuccinate mono-ester, 2-acryloxyethyl chlorendate mono-ester, etc. This optional component is generally present in amounts of up to 10% by weight preferably, 4 to 6%, of the adhesive based composition.

Particularly preferred adhesive base compositions are those prepared using, in addition to the pressure sensitive adhesive polymer and chlorosulfonated polyethylene, (a) at least one low molecular weight multifunctional vinyl monomer including the alkane diol esters of acrylic and methacrylic acid, the ethylene and polyethylene glycol esters, th pentaerythritol esters and the trimethylolpropane esters of acrylic and methacrylic acids; (b) at least one unsaturated oligomer as described above; and (c) at least one copolymerizable carboxylic acid as described above. When these three components are employed, the vinyl monomer and oligomer will generally be present in approximately the same concentrations, with the carboxylic acid component present in amounts of about 10% by weight of the adhesive base composition. The use of such multicomponent adhesive base compositions allows the practitioner to obtain a superior degree of structural characteristics (crosslink density), flexibility and adhesion for particular end uses.

In general, the pressure sensitive polymer will be employed in amounts of about 50–85%, preferably 55–70%, by weight of the final improved adhesive composition; the chlorosulfonated polyethylene in an amount of 4–24%, preferably 8–15%, by weight and the low molecular weight polymerizible monomer and/or unsaturated oligomer in an amount of 11–40%, preferably 22–35%, by weight.

The curing of the chlorosulfonated polyethylene and vinyl monomeric or oligomeric compounds is described in U.S. Pat. No. 3,890,407. In accordance with the present invention, it is required that the condensation reaction product of a primary or secondary amine and an aldehyde be employed as an initiator in the curing of the adhesive. Typical aldehydes employed in the preparation of these initiators include acetaldehydes, butyraldehyde, propionaldehyde, and hydrocinnamaldehydes. Preferred are the primary amines such as ethyl amine, hexyl amine, aniline, butyl amine and tolyl amines. Particularly preferred initiators are the butyraldehyde - aniline and butyraldehyde-butyl amine condensation products sold by E. I. duPont de Nemours & Co. under the tradenames "Accelerator 808" and "Accelerator 833," respectively. Several other useful initiators are discussed in U.S. Pat. No. 3,591,438, the disclosure of which is incorporated herein by reference.

In addition to the initiator required for the curing of the adhesives of the invention, various optional ingredients may also be present to facilitate curing. Among such components are included polymerization catalysts which are not active at room temperature in the absence of an initiator. Such catalysts include accelerators such as the oxidizable transition metals and/or free radical generators such as the organic peroxides and hydroperoxides (e.g., dibenzoyl peroxide, t-butyl hydroperoxide and cumene hydroperoxide) in the amounts of 0.05 to 2.5%, preferably 0.1 to 1%, by weight of the composition. Additionally, fillers, tackifiers, stabilizers, plasticizers and similar additives which do not detrimentally affect the basic properties of the adhesive may also be present.

Free radical stabilizers may also be added to the composition in order to improve storage life thereof by preventing premature polymerization. These stabilizers are well known by those skilled in the art and include hydroquinone, p-methoxyphenol, 2,6-di-t-butyl-4-methylphenol, etc.

In order to produce the improved pressure sensitive adhesives of the present invention, the pressure sensitive polymer, the chlorosulphonated polyethylene, the vinyl monomer and/or oligomer and any optional components (hereinafter referred to as the adhesive base component) are merely blended together in a suitable solvent. Suitable solvents are those known for use in pressure sensitive adhesive lacquers and include the chlorinated aliphatics, aromatics, ketones, esters and the like typically represented by toluene, methyl ethyl ketone, acetone, ethyl acetate, chloroform, etc. as well as compatible mixtures thereof. Although such organic solvents are preferred, the use of aqueous solvents is also contemplated herein. Furthermore, other diluents may also be present, e.g., aliphatics and alcohols such as ethyl alcohol, isopropyl alcohol, etc., as is known in the art.

The adhesive component may be employed in various forms. For instance, the adhesive may be coated onto a backing member and dried to provide pressure-sensitive coated sheet materials, such as tapes, sheets, or panels. Cellophane, vinyls, cloth, polyester film, rubber, various laminates and other such flexible materials, as well as wood, metal, hardboard, and other less flexible backings, can be coated in this manner. In some cases, the adhesive can be used as a dispersion or in solution as a liquid adhesive and applied just prior to use. In the case of tape, the coated, dried product is generally self-wound in roll form. As an alternate to coating the part or substrate directly, the adhesive is often coated onto a release liner and transferred to the part after the adhesive has been dried. Often the release liner is coated on both sides with an abherent material, such as a silicone polymer, so it may be self-wound after the adhesive has dried. In this instance, the adhesive in film form may be transferred to the part or substrate at some later time.

The amine-aldehyde initiator component of the adhesive composition may be applied alone, in a solvent, (e.g., dichlorodifluoromethane, dichloromethane, monochlorodifluoromethane) or may be blended with 1–50% by weight of a high molecular weight polymer or with comparable amounts of a conventional pressure sensitive adhesive. In accordance with the latter embodiment, the pressure sensitive adhesive provides good initial contact and cohesive strength, thereby preventing flow of the initiator on the surface during coating and facilitating application of the primer without seriously retarding the crosslinking rate of the adhesive. The initiator itself, or in any of the diluted forms described above, may be applied by brushing, spraying, or the like, upon at least one surface to be bonded and any solvent present allowed to evaporate leaving a deposit of primer on the surface. The initiator may be applied in such manner to one or both surfaces or substrates prior to bonding. Alternatively, but not preferably, the initiator may be mixed with the adhesive base component (i.e., the pressure sensitive polymer, chlorosulphonated polyethylene and vinyl monomer or oligomer) immediately prior to coating or the initiator may be applied to at least one of the substrates which has been previously coated with the adhesive base component.

The amount of initiator to be applied to a given surface should be no more than necessary to obtain efficient acceleration of the bonding operation. Excess initiator on one or more of the bonded surfaces can adversely affect the strength of the final bond. Further, when the amount of bonding initiator exceeds about 20% by weight of the adhesive, little if any additional increase in speed is noted. Generally, an amount of bonding initiator of from about 1.0 to about 5.0 percent by weight of the adhesive base component is adequate.

The pressure sensitive adhesives of the present invention may be used to bond virtually any substrates including steel, aluminum, copper, brass, plastics (i.e., polyesters, polyamides, polyurethanes, polyvinyl chloride), wood, prepainted surfaces, glass and paper. In some instances, as in the case of bonding polyolefins, surface treatment (e.g., corona discharge) may be required to aid in promoting adhesion.

In the examples the following testing procedures are employed to measure the comparative properties of the various adhesives.

Williams Plasticity (ASTM Method D-926)

In determining Williams plasticity values, a film having a dry thickness of 4 to 5 mils. of the adhesive polymer being evaluated is cast onto a conventional release sheet. The dry film is peeled from the release sheet and molded into a solid cylindrical slug approximately 1.5 cm. wide, 2 cm. long and weighing exactly 1.8 gms. The slug is then conditioned for 15 minutes at a temperature of 38° C. whereupon it is inserted between the two paralleled platens of the plastometer which have also been maintained at a temperature of 38° C. The upper platen, which is weighted with 5 kg. and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow, and thus, denote a firmer polymer, whereas low plasticity values are indicative of less resistance to flow, and thus, denote a softer polymer.

Shear Adhesion Test (4 psi hold)

The shear strength is measured by transferring the adhesive onto a 2-mil. thick polyethylene terephthalate film at a sample thickness of 5 mils. The coated sample (½ inch in width) is then applied to a steel panel with a 0.5 inch primed overlap joint. A one pound weight is suspended from the sample with the primed steel panel maintained vertically and the time until separation occurs is measured. The test is carried out in an oven at 150° C. unless otherwise indicated. The test is a measure of the structural cohesive strength and ability to maintain cohesive strength over a period of time at elevated temperatures. Thus, the adhesives showing the longest times are preferred.

EXAMPLE 1

An improved pressure sensitive adhesive in accordance with the present invention was prepared from a polyvinyl ether polymer.

Thus, 55 parts (anhydrous weight) polyvinyl ethyl ether (Williams Plasticity No. 2.3) were combined with 10 parts Hypalon 30 (parts are on an anhydrous basis—Hypalon used in the form of a 50% solids solution in ethyl acetate), 30 parts trimethylolpropane triacrylate, 5 parts methacrylic acid, 0.4 parts 2,6-di-t-butyl-4-methylphenol and 1.0 part cumene hydroperoxide.

A five mil. dry film of the resultant composition on release paper was transfer coated to a 2 mil. thick polyester film. An adhesive bond was made to stainless steel primed with an aniline-butyraldehyde condensation product (duPont Accelerator 808) as initiator. A four psi hold test (Shear Adhesion test) was run on the sample and the film found to display more than one hour holding power at 150° C., thus showing increased high temperature performance over a five mil. film of the starting pressure sensitive adhesive polymer which had not been treated in accordance with the present invention and which exhibited only a 1–5 min. hold at those elevated temperatures.

EXAMPLES 2–3

In the following two examples, the procedure of Example 1 was repeated using the same starting pressure sensitive polymer with different monomer and monomer blends.

Table

| Ingredient | Example 2 | Example 3 |
|---|---|---|
| Polyvinyl ethyl ether | 55 | 55 |
| Hypalon 30 | 10 | 10 |
| Trimethylolpropane triacrylate | 19 | — |
| Tetraethyleneglycol diacrylate | — | 15 |
| Methacrylic acid | 6 | 5 |
| Hydroxypropyl acrylate | 10 | — |
| 1,6-Hexanediol diacrylate | — | 15 |
| 2,6-di-t-butyl-4-methylphenol | — | 0.2 |
| Cumene hydroperoxide | — | 1.0 |

Four psi hold tests performed on each of the samples gave results in excess of 1 hour at 150° C.

EXAMPLE 4

This example illustrates the preparation of an improved pressure sensitive adhesive in accordance with the present invention using a pressure sensitive polyester as the base polymer.

In this example, the procedure of Example 1 was employed using a pressure sensitive polyester prepared in accordance with the procedure of Example 1 of U.S. Pat. No. 3,975,323 using 181 parts dimethyl terephthalate, 257 parts 1,4-butanediol, 0.48 parts dibutyltin oxide, 0.19 parts antimony trioxide, 2.78 parts Weston 618 phosphite antioxidant, 512 parts Empol 1014 dimer acid, 86 parts xylene, 28.5 parts Niax Polyol PCP 0300 (triol). Fifty parts of the polyester was then blended with 45 parts Picco L 60 and 5 parts Picco Tex 100 tackifying resins and then used in the following formulation:

| | Parts |
|---|---|
| Pressure sensitive polyester (Williams Plasticity No. 2.5) | 55 |
| Hypalon 30 | 10 |
| Trimethylolpropane triacrylate | 30 |
| Methacrylic acid | 5 |
| Cumene hydroperoxide | 1 |
| 2,6-di-t-butyl-4-methylphenol | 0.2 |

Four psi hold tests performed on this adhesive gave results in excess of 1 hour at 150° C.

EXAMPLE 5

This example illustrates the preparation of an improved pressure sensitive adhesive in accordance with the present invention using a pressure sensitive organopolysiloxane as the base polymer.

The procedure employed in Example 1 was repeated using SILGRIP SR 574, a silicone adhesive available from General Electric Company.

|  | Parts |
| --- | --- |
| SILGRIP SR-574 (Williams Plasticity No. 1.45) | 55 |
| Hypalon 30 | 10 |
| Trimethylolpropane triacrylate | 30 |
| Methacrylic acid | 5 |
| Cumene hydroperoxide | 1 |

Four psi hold tests performed on this adhesive gave results in excess of 1 hour at 100° C.

EXAMPLES 6-8

These examples illustrate the use of other polyvinyl ethers which may be employed in the present invention.

Thus, when formulations are prepared using the components and amounts shown below, pressure sensitive adhesives characterized by superior strength and solvent resistance may be prepared.

|  | Examples | | |
| --- | --- | --- | --- |
|  | 6 | 7 | 8 |
| Polyvinyl isobutyl ether (Williams Plasticity No. 2.2) | 55 | — | — |
| Polyvinyl secondary butyl ether (Williams Plasticity No. 2.4) | — | 50 | — |
| Polyvinyl isopropyl ether (Williams Plasticity No. 2.7) | — | — | 55 |
| Trimethylolpropane triacrylate | 15 | — | 15 |
| Tetramethyleneglycol dimethacrylate | — | 20 | 10 |
| Hypalon 30 | 10 | 10 | 15 |
| 1,6-hexanediol diacrylate | 15 | 15 | — |
| Methacrylic acid | 5 | — | 5 |
| Acrylic acid | — | 5 | — |
| Cumene hydroperoxide | 0.1 | 1.5 | 0.5 |

EXAMPLE 9

Similarly, other polyesters may be used in the preparation of the improved pressure sensitive adhesives of the invention. As an example, a polyester prepared from 354 g. sebacic acid, 21 g. maleic anhydride, 22 g. succinic anhydride, 208 g. 1,2-propylene glycol and 0.4 g. zinc chloride (Williams Plasticity No. 2.9) when used in the following formulation will produce a pressure sensitive adhesive characterized by superior properties shown in Example 4.

|  | Parts |
| --- | --- |
| Pressure sensitive polyester described above | 55 |
| Trimethylolpropane triacrylate | 30 |
| Hypalon 30 | 10 |
| Methacrylic acid | 5 |

Although specific examples of the invention have been set forth hereinabove, it is not intended that the invention be limited solely thereto, but to include all the variations and modifications within the scope of the appended claims.

We claim:

1. An improved pressure sensitive adhesive composition comprising
   (i) an adhesive base component comprising
      (A) from 50 to 85% by weight of an adhesive polymer selected from the group consisting of pressure sensitive polyvinyl ethers, polyesters and silicones having a Williams Plasticity number within the range of 1.4 to 3 mm and a Tg less than or equal to $-20°$ C.,
      (B) from 4 to 24% by weight of a chlorosulfonated polyethylene, and
      (C) from 11 to 40% by weight of a polymerizable low molecular weight vinyl monomer or polymerizable unsaturated oligomer or mixtures thereof; and
   (ii) an initiator comprising a condensation reaction product of a primary or secondary amine and an aldehyde to effect curing of the adhesive base component.

2. The pressure sensitive adhesive composition of claim 1 wherein the pressure sensitive polymer comprises a polyvinyl alkyl ether wherein the alkyl group contains 2 to 8 carbon atoms.

3. The pressure sensitive adhesive composition of claim 2 wherein the polyvinyl alkyl ether is selected from the group consisting of polyvinyl ethyl ether, polyvinyl isobutyl ether, polyvinyl secondary butyl ether and polyvinyl isopropyl ether.

4. The pressure sensitive adhesive composition of claim 1 wherein the chlorosulfonated polyethylene component contains from about 25 to 70 weight percent chlorine and about 3 to 160 millimoles sulfonyl chloride moiety per 100 grams polymer and the polyethylene from which the polymer is prepared has a melt index of about 4–500.

5. The pressure sensitive adhesive composition of claim 1 wherein the low molecular weight vinyl monomer is selected from the group consisting of
   (i) acrylic and methacrylic acid,
   (ii) hydroxyalkyl esters of acrylic and methacrylic acid,
   (iii) glycidyl esters of acrylic and methacrylic acid,
   (iv) ethylene glycol and polyethylene glycol diesters of acrylic and methacrylic acid,
   (v) polyhydric alcohol esters of acrylic and methacrylic acid,
   (vi) non-gem alkanediol esters of acrylic and methacrylic acid,
   (vii) the alkyl and alkyl substituted alkyl acrylates and methacrylates wherein the alkyl groups contain from 2 to 20 carbon atoms,
   (viii) the cycloalkyl esters of acrylic and methacrylic acids, and
   (ix) trimethylolpropane triacrylate and trimethylolpropane trimethacrylate.

6. The pressure sensitive adhesive composition of claim 1 wherein the curable unsaturated oligomer is selected from the group consisting of unsaturated urethanes, unsaturated epoxides, unsaturated polyesters and vinyl terminated elastomers.

7. The pressure sensitive adhesive composition of claim 6 wherein the unsaturated epoxide is a reaction product of acrylic or methacrylic acid with a polyfunctional epoxy compound containing at least two epoxy groups per molecule and having a molecular weight of 200 to 1500.

8. The pressure sensitive adhesive composition of claim 1 wherein the amine aldehyde component is formed from the condensation reaction of butyraldehyde and aniline or butyraldehyde and butyl amine.

9. The pressure sensitive adhesive composition of claim 1 wherein there is additionally present in the adhesive component (i) from 0.05 to 2.5% by weight of a free radical generator.

10. An improved pressure sensitive adhesive composition comprising:
(i) an adhesive base component comprising
   (A) from 50 to 85% by weight of an adhesive polymer selected from the group consisting of pressure sensitive polyvinyl ethers, polyesters and silicones having a Williams plasticity number within the range of 1.4 to 3 mm and a Tg less than or equal to −20° C.
   (B) from 4 to 24% by weight of a chlorosulfonated polyethylene, and
   (C) from 11 to 40% of a combination of:
      (1) at least one low molecular weight multifunctional vinyl monomer,
      (2) at least one unsaturated oligomer and
      (3) at least one copolymerizable carboxylic acid; and
(ii) an initiator comprising a condensation reaction product of a primary or secondary amine and an aldehyde to effect curing of the adhesive base component.

11. A pressure sensitive adhesive coated article comprising a backing member having thereon a layer of the adhesive composition of claim 1.

12. A pressure sensitive adhesive coated article comprising a backing member having thereon a layer of the adhesive composition of claim 10.

13. A pressure sensitive film adhesive comprising a cured film of the adhesive composition of claim 1.

14. A pressure sensitive film adhesive comprising a cured film of the adhesive composition of claim 10.

* * * * *